United States Patent [19]

Gusching

[11] Patent Number: 4,856,153
[45] Date of Patent: Aug. 15, 1989

[54] SPINDLE MECHANISM

[75] Inventor: Nagle V. Gusching, Sidney, Ohio

[73] Assignee: The Monarch Machine Tool Company, Sidney, Ohio

[21] Appl. No.: 263,041

[22] Filed: Oct. 26, 1988

[51] Int. Cl.$^4$ .................................................. B23C 5/26
[52] U.S. Cl. ..................... 29/26 A; 29/27 A; 29/27 C; 409/144; 409/231
[58] Field of Search ...................... 29/26 A, 568, 27 C, 29/27 A, 48.5 R; 409/234, 233, 232, 231, 144; 82/37, 36 R; 408/239 R, 239 A, 20; 384/603, 624

[56] References Cited

U.S. PATENT DOCUMENTS

| | | | |
|---|---|---|---|
| 2,957,393 | 10/1960 | Kampmeier | 409/231 |
| 3,397,614 | 8/1968 | Meinke | 409/231 |
| 3,851,364 | 12/1974 | Noa et al. | 29/26 A |
| 4,051,583 | 10/1977 | Kato et al. | 29/568 |
| 4,570,313 | 2/1986 | Holmstrom et al. | 29/26 A |
| 4,599,023 | 7/1986 | Poncenot | 409/233 |
| 4,643,623 | 2/1987 | Kondo et al. | 409/232 |
| 4,657,412 | 4/1987 | McLarty et al. | 384/624 |

FOREIGN PATENT DOCUMENTS 3436938 10/1985 Fed. Rep. of Germany ...... 409/231

OTHER PUBLICATIONS

Bulletin of Yamazaki Mazak Corporation.

Primary Examiner—William Briggs
Attorney, Agent, or Firm—Pearne, Gordon, McCoy & Granger

[57] ABSTRACT

A spindle mechanism is capable of rotating for a rotative tool and is capable of being locked for mounting a nonrotative tool. First and second curvic couplings may be forced into engagement by a large hydraulic force which concurrently unloads a combined thrust and radial bearing at the outboard end of the support. This permits the spindle, when mounting a nonrotative tool, to be rigidly supported in a nonrotative condition. A smaller hydraulic force may be utilized to move the spindle axially inwardly which disengages the first and second curvic couplings and preloads the combined thrust and radial bearing providing a properly preloaded rotational mode of support when the spindle is mounting a rotative tool. The foregoing abstract is merely a resume of one general application, is not a complete discussion of all principles of operation or applications, and is not to be construed as a limitation on the scope of the claimed subject matter.

11 Claims, 1 Drawing Sheet

SPINDLE MECHANISM

BACKGROUND OF THE INVENTION

Rotating spindles for tool holders have taken many forms. U.S. Pat. No. 2,957,393 discloses a frictional clamp on a rotary spindle. U.S. Pat. No. 3,397,614 discloses a piston surrounding a collet which moves axially to clamp a spindle to a quill. U.S. Pat. No. 4,051,583 discloses a turret with plural spindles, each of which can be oriented in a particular angular position. U.S. Pat. No. 4,570,313 discloses a spindle which may be rotatable or which may be locked against rotation by interengagement of three sets of teeth. U.S. Pat. 4,643,623 discloses a claw clutch which is engaged when the tool holder is not in the spindle and disengaged when inserted in the spindle so it is free to rotate. In U.S. Pat. No. 4,570,313, when the spindle is clamped against rotation, any vibration of the tool in the tool spindle mount as the tool works on a workpiece will be transmitted to the ball bearings despite the presence of the interlocking gear teeth. This can have a damaging effect on the bearings because there is no rolling contact at that time, and such vibration would tend to Brinell the surface of the bearing races.

SUMMARY OF THE INVENTION

The problem to be solved, therefore, is how to construct a spindle which may be used for a tool holder with either a rotative or a nonrotative tool holder, yet which, when nonrotative, will be rugged and able to withstand the tool-workpiece forces without damage to the bearings which are nonrotating at that time.

This problem is solved by a combined rotative tool and nonrotative tool spindle mechanism, comprising, in combination, a support, a first spindle in said support, a combined thrust and radial bearing in said support journaling said spindle, said spindle adapted to receive either a rotative or nonrotative tool, motor means connectable to drive said spindle in rotation, a first dog clutch acting on said support, a second complementary dog clutch cooperable with said first dog clutch and acting on said rotatable spindle, first means to relatively move together said first and second dog clutches and to unload said bearing for locking said spindle against rotation whereby a rotating workpiece may be machined with a nonrotative tool in said spindle, and second means to relatively move apart said first and second dog clutches and to engage said bearing for rotation of said spindle by said motor means, whereby a workpiece may be machined with a rotative tool in said spindle.

Accordingly, an object of the invention is to provide a spindle which engages a bearing for rotational modes and unloads the bearing for nonrotative modes.

Another object of the invention is to provide a rotative spindle mounted in a bearing, and providing relative axial movement between the spindle and bearing at the same time as relative axial movement to engage a dog clutch for a nonrotative condition of the spindle with an unloaded bearing.

Other objects and a fuller understanding of the invention may be had by referring to the following description and claims, taken in conjunction with the accompanying drawing.

DESCRIPTION OF THE PREFERRED EMBODIMENT

Figures 1, 2:
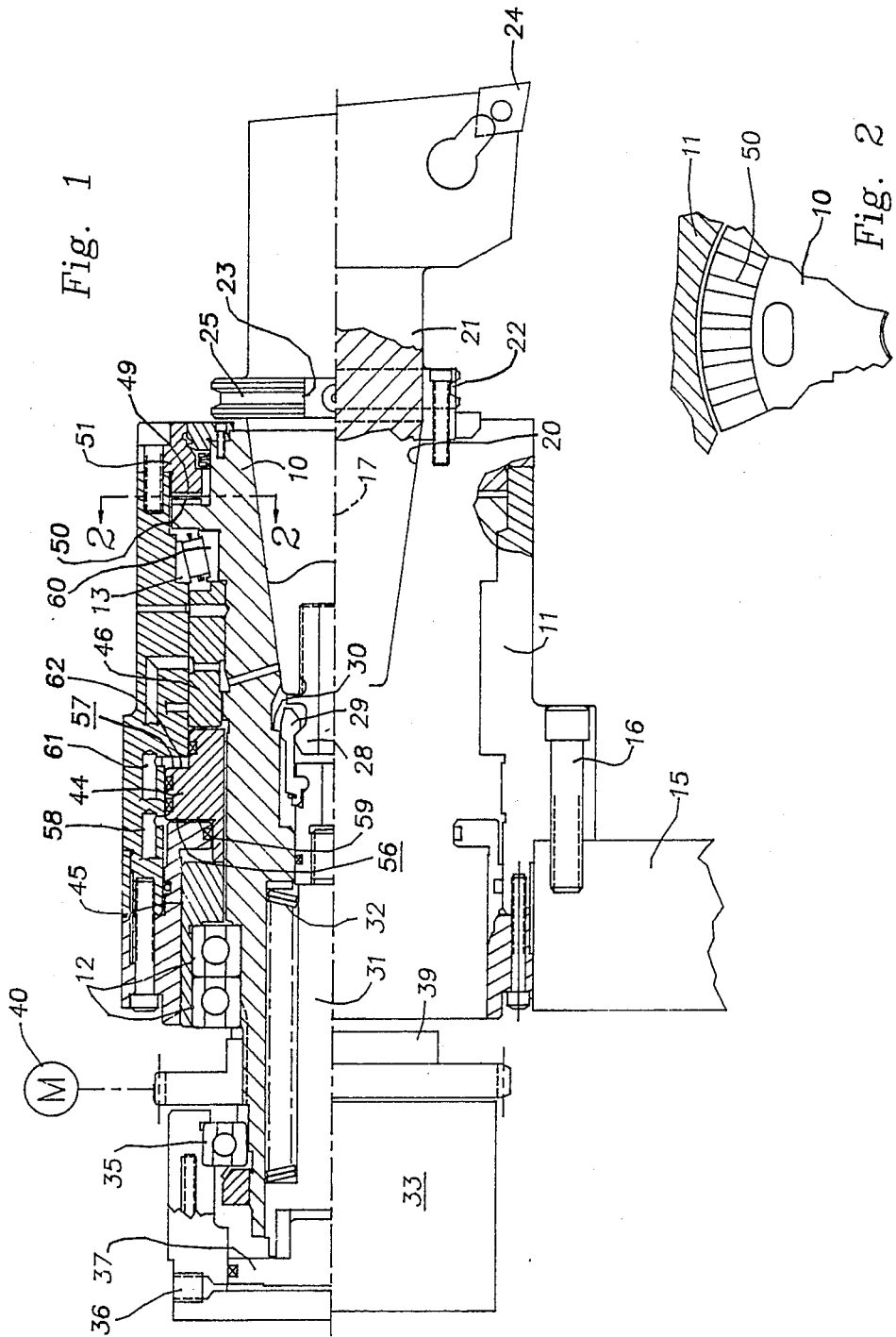
FIG. 1 is a longitudinal view, partly in section, of a spindle incorporating the invention.
FIG. 2 is a sectional view on line 2—2 of FIG. 1.

A spindle 10 is journaled in a support 11 by ball bearings 12 at the rear and by a conical roller bearing 13 near the outer end of the spindle. The support 11 may be mounted on a base 15 by means of machines screws 16. The support 11 is a generally hollow, tubular structure to carry the rotative spindle 10 journaled therewithin about a longitudinal axis 17. The spindle carries a socket, shown as a conical socket 20, to receive a tool holder 21. The spindle has a key 22 entering into a keyway 23 in the tool holder in order to orient the tool holder to a known position. The tool holder 21 has a cutting tool tip, shown as a tool tip 24, which is oriented by the key 22 in the keyway 23. The tool holder 21 also may have a tool changing flange 25.

The tool holder 21 may have a retention knob 28. This may be engaged by locking fingers 29 which are cammed into engagement with the button 28 by a cam 30 as a central plunger 31 is moved axially inwardly by means of springs, such as Belleville springs 32. A rotary actuator 33 is cantilever-journaled on the rear end of the spindle 10 by a bearing 35. Hydraulic pressure at an inlet 36 acts on a piston 37 to move the central plunger 31 forwardly against the urging of the springs 32 and thus release the tool holder 21, when desired. A gear 39 is splined to the spindle 10 to the rear of the bearings 12, and may selectively be driven by a motor 40 for selective rotation of the spindle 10 when it mounts a rotative tool holder.

An annular piston 44 surrounds the spindle 10 and is within the support 11. A sleeve 45 extends between the piston and the bearings 12. Another sleeve 46 extends between the piston 44 and the conical roller bearing 13. A first dog clutch 49 acts on the support 11 by being unitary with a ring 51 secured to the outer end of the support 11. A second dog clutch 50 complementary to the first dog clutch acts on the spindle 10, and, as shown, it is welded to it. In the preferred embodiment, these dog clutches 49 and 50 are first and second curvic couplings which have relatively fine teeth, as shown in FIG. 2. As an example, these teeth may be only about 0.077 inch in depth. These curvic couplings are shown axially separated in the upper half of FIG. 1 and, as an example, this separation might be by a movement of the spindle 10 to the left a small distance, e.g., 0.094 inch. This displacement is shown relative to the lower half of FIG. 1 whereat the curvic couplings are shown in engagement.

First means 56 is provided to relatively move together the first and second dog clutches 49 and 50, as shown in the lower half of FIG. 1, and at the same time to unload the bearing 13. This is a combined thrust and radial bearing due to the conical races and the conical rollers. This first means 56 includes means to supply a relatively high pressure to a fluid inlet 58. This supplies a relatively large pressure, e.g., 1000 psi, of oil pressure, to a large face area 59 of the piston 44. This acts through the sleeve 46 to move the inner bearing race 60 axially outwardly. Since the rollers are conical in shape, this unloads the bearing 13 so that the rollers do not make simultaneous contact with the inner and outer races. At the same time, this axial outward movement of the spindle 10 moves the curvic couplings 49 and 50 into engagement. This locks the spindle rotatively to the support 11 with a considerable force of 10,000 pounds to make a rigid support for the tool holder 21. This means that the tool tip 24 may withstand vibration, off-center and cantilever loads which are borne by the curvic couplings and not at all transmitted to the combined thrust and radial bearing 13. The ball bearings 12 are at the axial inner end of the spindle 10 and are far removed from this tool loading. As a consequence, they are not damaged by any vibration, off-center or cantilever load on the tool tip 24 but, instead, provide precise positioning of the inner axial end of the spindle 10.

Second means 57 is provided to relatively move apart the first and second dog clutches 49 and 50 and to engage the conical roller bearing 13 for rotation of the spindle by the motor 40. This second means 57 includes a fluid inlet 61 to supply reduced pressure fluid to a smaller face 62 of the piston 44 to urge this piston rearwardly. This would be when the large pressure was removed from the face 59 of the piston. This relatively smaller pressure may be in the order of 100 psi, for example, which acts through the sleeve 45 and the bearings 12 to move the spindle rearwardly. This disengages the dog clutches 49 and 50 and engages the bearing 13. Preferably, this is a force which also preloads the bearing 13 so that a rotative tool in the spindle 10 may operate on a workpiece, whether the workpiece is rotating or stationary. This preload of the bearing 13 establishes a precise position of the rotative tool for accurate machining. This rotative tool may be any of the usual type, such as milling cutter, end mill, drill, or even a boring tool.

It will be noted that the first and second means 56 and 57 are connected to axially move one of the spindle 10 and support 11 in opposing directions. In this preferred embodiment, the first and second means are connected to axially move the spindle in opposing directions. The invention has the advantage that the first means 56 is connected to move the spindle 10 forwardly out of the support 11 to engage the dog clutches 49 and 50. The first dog clutch 49 is fixed on the support 11, so upon engagement of the first and second dog clutches 49 and 50, the nonrotative tool, such as tool tip 24, is precisely positioned and securely held in that position for precise machining. The force of this first means 56 is many times greater than the force of the second means. The area of the large face 59 of the annular piston 44 is about double that of the area of the small face 62, so that with the pressures disclosed, there is about twenty times more force locking this spindle in the forward axial position against rotation, compared with the rearward axial force which permits rotation and preloads the bearing 13. It will further be noted that the first means 56 and the second means 57 are each connected for relative axial movement of the dog clutches 49 and 50. The first means 56, for example, not only provides this relative axial movement, but also concurrently unloads the bearing 13 upon relative axial movement in one direction, in this case, an outward axial movement of the spindle 10. Similarly, the second means 57 moves the dog clutches 49 and 50 out of engagement and concurrently preloads the bearing 13 for rotation of the spindle by the motor 40. By this means, a workpiece may be machined with a rotative tool in the spindle 10.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A combined rotative tool and nonrotative tool spindle mechanism, comprising, in combination:
   a support;
   a first spindle in said support;
   a combined thrust and radial bearing in said support at least partially journaling said spindle;
   said spindle adapted to receive either a rotative or nonrotative tool;
   motor means connectable to drive said spindle in rotation;
   a first dog clutch acting on said support;
   a second complementary dog clutch cooperable with said first dog clutch and acting on said rotatable spindle;
   first means to relatively move together said first and second dog clutches and to unload said bearing for locking said spindle against rotation, whereby a rotating workpiece may be machined with a nonrotative tool in said spindle; and
   second means to relatively move apart said first and second dog clutches and to engage said bearing for rotation of said spindle by said motor means, whereby a workpiece may be machined with a rotative tool in said spindle.

2. The spindle mechanism as set forth in claim 1, including first and second cooperable curvic couplings as said first and second dog clutches, respectively.

3. The spindle mechanism as set forth in claim 1, wherein said combined thrust and radial bearing is a conical bearing.

4. The spindle mechanism as set forth in claim 1, wherein said combined thrust and radial bearing is a conical roller bearing.

5. The spindle mechanism as set forth in claim 1, wherein said first and second means are connected to axially move one of said spindle and said support in opposing directions.

6. The spindle mechanism as set forth in claim 5, wherein said first and second means are connected to axially move said spindle in opposing directions.

7. The spindle mechanism as set forth in claim 6, wherein said first means is connected to move said spindle forwardly out of said support to engage said dog clutches.

8. The spindle mechanism as set forth in claim 7, wherein the force of said first means is many times greater than the force of said second means to assure positive positioning of said spindle when a nonrotative tool is mounted.

9. The spindle mechanism as set forth in claim 1, wherein said second means establishes a small force to preload said bearing to assure positive positioning of said spindle when a rotative tool is mounted.

10. The spindle mechanism as set forth in claim 1, wherein said first means is connected for relative axial movement of said dog clutches.

11. The spindle mechanism as set forth in claim 10, wherein said first means is connected to concurrently unload said bearing upon relative axial movement in a single direction.

* * * * *